(12) United States Patent
Nambiar et al.

(10) Patent No.: US 9,467,326 B2
(45) Date of Patent: Oct. 11, 2016

(54) RATE LIMITING MECHANISM BASED ON DEVICE LOAD/CAPACITY OR TRAFFIC CONTENT

(71) Applicant: Aruba Networks, Inc., Sunnyvale, CA (US)

(72) Inventors: Brijesh Nambiar, Sunnyvale, CA (US); Ramsundar Janakiraman, Sunnyvale, CA (US); Ravinder Verma, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 170 days.

(21) Appl. No.: 13/918,760

(22) Filed: Jun. 14, 2013

(65) Prior Publication Data
US 2014/0153422 A1   Jun. 5, 2014

Related U.S. Application Data

(60) Provisional application No. 61/732,829, filed on Dec. 3, 2012.

(51) Int. Cl.
| | |
|---|---|
| H04L 12/00 | (2006.01) |
| H04L 29/06 | (2006.01) |
| H04L 12/801 | (2013.01) |
| H04L 12/745 | (2013.01) |
| H04L 12/773 | (2013.01) |

(Continued)

(52) U.S. Cl.
CPC ......... *H04L 29/06217* (2013.01); *H04L 45/60* (2013.01); *H04L 45/748* (2013.01); *H04L 47/11* (2013.01); *H04L 47/28* (2013.01); *H04L 63/0272* (2013.01); *H04L 63/101* (2013.01); *H04L 63/20* (2013.01); *H04L 47/122* (2013.01)

(58) Field of Classification Search
None
See application file for complete search history.

(56) References Cited

U.S. PATENT DOCUMENTS

| 6,651,096 B1* | 11/2003 | Gai et al. ..................... 709/223 |
|---|---|---|
| 6,728,265 B1 | 4/2004 | Yavatkar et al. |
| 7,624,263 B1 | 11/2009 | Viswanath et al. |

(Continued)

FOREIGN PATENT DOCUMENTS

WO   2011/019372 A2   2/2011

OTHER PUBLICATIONS

Non-Final Office Action in U.S. Appl. No. 13/918,748 dated Jan. 2, 2015. 13 pages.

(Continued)

*Primary Examiner* — John Blanton

(57) ABSTRACT

The present disclosure discloses a method and network device for a rate limiting mechanism based on device load/capacity or traffic content. Specifically, the system receives a request from a network node, and determines whether a ratio between a current load and a capacity exceeds a threshold. If so, the system determines a wait time period based on current load/capacity ratio, and responds to the network node with a message including the wait time period. Moreover, the system can inspect content of the request to determine a message type, and whether the message type indicates that the request is associated with dependent messages. If so, the system responds to the request with a busy message including the wait time period. Further, the system rejects new session requests if the number of concurrent sessions currently connected to the network device approaches the number of sessions associated with a regression point.

19 Claims, 9 Drawing Sheets

(51) Int. Cl.
*H04L 12/841* (2013.01)
*H04L 12/803* (2013.01)

(56) References Cited

U.S. PATENT DOCUMENTS

| | | | |
|---|---|---|---|
| 2003/0021288 A1* | 1/2003 | Hayashi et al. | 370/461 |
| 2005/0105524 A1 | 5/2005 | Stevens et al. | |
| 2008/0095167 A1 | 4/2008 | Bruss | |
| 2010/0037311 A1 | 2/2010 | He et al. | |
| 2010/0172356 A1 | 7/2010 | Tavares et al. | |
| 2010/0241831 A1* | 9/2010 | Mahadevan et al. | 712/42 |
| 2011/0199898 A1* | 8/2011 | Cho et al. | 370/230 |
| 2011/0292945 A1 | 12/2011 | Yasuda | |
| 2012/0057599 A1 | 3/2012 | Yong | |
| 2012/0092996 A1* | 4/2012 | Lautenschlaeger | 370/235 |
| 2012/0281530 A1* | 11/2012 | Sambhwani et al. | 370/230 |
| 2013/0042301 A1* | 2/2013 | Mahamuni et al. | 726/3 |
| 2013/0246619 A1 | 9/2013 | Raja et al. | |
| 2013/0286846 A1 | 10/2013 | Atlas et al. | |
| 2014/0274082 A1* | 9/2014 | Huang et al. | 455/450 |

OTHER PUBLICATIONS

Non-Final Office Action in U.S. Appl. No. 13/928,300 dated Nov. 5, 2014. 11 pages.
Non-Final Office Action in U.S. Appl. No. 13/692,622 dated Sep. 30, 2014. 5 pages.

* cited by examiner

| AP SUBNET 500 | CONTROLLER IP 510 | PROTOCOL 520 | ACCESS CONTROL 530 |
|---|---|---|---|
| 10.10.20.0/16 | 10.10.10.10 | ESP | PERMIT @100/sec |
| ... ... | ... ... | ... ... | ... ... |

FIG. 5A

| AP SUBNET 540 | CONTROLLER IP 550 | PROTOCOL 560 | SRC 570 | DEST 580 | ACCESS CONTROL 590 |
|---|---|---|---|---|---|
| 10.10.30.0/8 | 10.10.10.10 | UDP | ANY | 8211 | PERMIT @100/sec |
| ... ... | ... ... | ... ... | ... ... | ... ... | ... ... |

FIG. 5B

RATE LIMITING MECHANISM BASED ON DEVICE LOAD/CAPACITY OR TRAFFIC CONTENT

RELATED APPLICATIONS

This application claims the benefit of priority on U.S. Provisional Patent Application 61/732,829, filed Dec. 3, 2012, the entire contents of which are incorporated by reference.

Related patent applications to the subject application include the following: (1) U.S. patent application entitled "System and Method for Achieving Enhanced Performance with Multiple Networking Central Processing Unit (CPU) Cores" by Janakiraman, et al., U.S. application Ser. No. 13/692,622, filed Dec. 3, 2012; (2) U.S. patent application entitled "Ingress Traffic Classification and Prioritization with Dynamic Load Balancing" by Janakiraman, et al., U.S. application Ser. No. 13/692,608, filed Dec. 3, 2012; (3) U.S. patent application entitled "Method and System for Maintaining Derived Data Sets" by Gopalasetty, et al., U.S. application Ser. No. 13/692,920, filed Dec. 3, 2012; (4) U.S. patent application entitled "System and Method for Message handling in a Network Device" by Palkar, et al., U.S. application Ser. No. 13/918,732, filed Jun. 14, 2013; (5) U.S. patent application entitled "Session-Based Forwarding" by Janakiraman, et al., U.S. application Ser. No. 13/918,748, filed Jun. 14, 2013; (6) U.S. patent application entitled "Control Plane Protection for Various Tables Using Storm Prevention Entries" by Janakiraman, et al., U.S. application Ser. No. 13/918,770, filed Jun. 14, 2013. The entire contents of the above applications are incorporated herein by reference.

FIELD

The present disclosure relates to networking processing performance of a symmetric multiprocessing (SMP) network architecture. In particular, the present disclosure relates to a system and method for providing a rate limiting mechanism based on device load/capacity ratio or traffic content.

BACKGROUND

A symmetric multiprocessing (SMP) architecture generally is a multiprocessor computer architecture where two or more identical processors can connect to a single shared main memory. In the case of multi-core processors, the SMP architecture can apply to the CPU cores.

In an SMP architecture, multiple networking CPUs or CPU cores can receive and transmit network traffic from a large number of access points. Generally, each access point and/or client in the network will need to be properly authenticated by the network. Such authentication may involve a multi-step process, e.g., including at least step 1, step 2, and step 3 for each access point. On a highly scalable platform, it is possible that when a large volume of authentication requests are handled by the system around the same time period, a significant number of requests will not be able to complete through all of the steps in the multi-step process. Thus, those requests will have to be re-transmitted, and their corresponding clients will need to renegotiate the authentication process, i.e., going through the same multi-step process again from the very first step.

Therefore, it is very important for the system to have a mechanism that ensures initiated authentication processes complete prior to committing to new authentication processes. A conventional solution involves discarding any new authentication requests or returning a busy message, if there are any existing incomplete authentication processes have been initiated, so that those existing authentication processes have a better chance to complete without suffering downgraded system performance from accepting new authentication requests. However, having no knowledge and visibility of the real-time system load and/or capacity, the clients whose requests are discarded or declined will re-transmit the same request at a random future time. Moreover, it is possible that when the requests get re-transmitted, the system is still busy and still cannot commit to the new authentication requests from clients.

BRIEF DESCRIPTION OF THE DRAWINGS

The present disclosure may be best understood by referring to the following description and accompanying drawings that are used to illustrate embodiments of the present disclosure.

FIGS. 5A-5B illustrate exemplary access control lists (ACLs) for rate limiting according to embodiments of the present disclosure.

DETAILED DESCRIPTION

Figure 1:
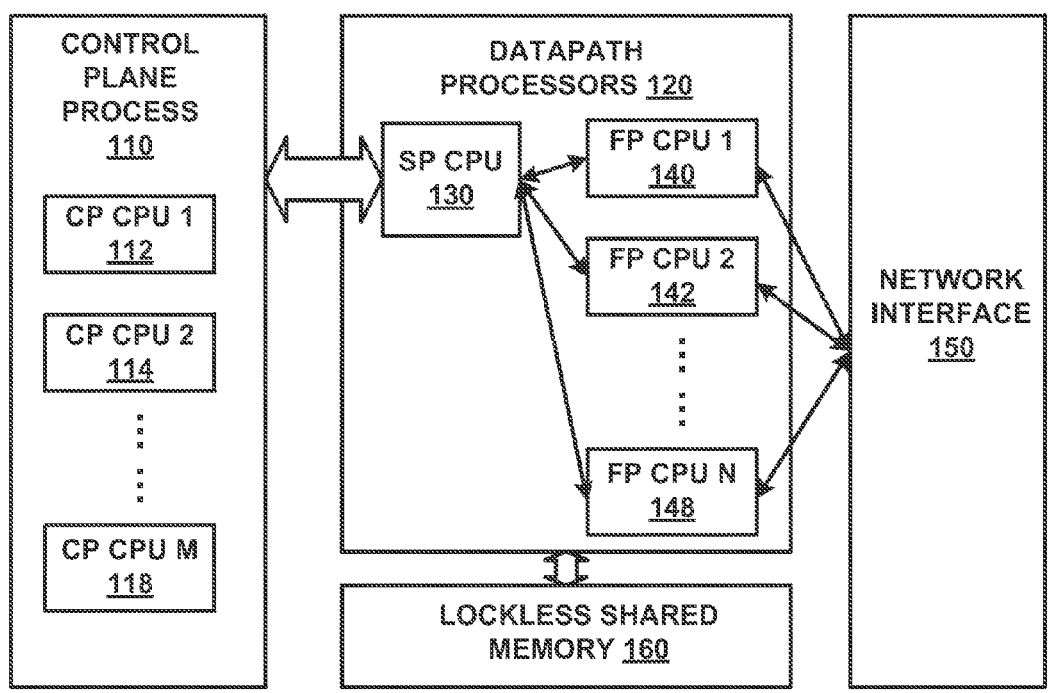
FIG. 1 illustrates an exemplary architecture at multiple processing planes according to embodiments of the present disclosure.

In the following description, several specific details are presented to provide a thorough understanding. While the context of the disclosure is directed to SMP architecture performance enhancement, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to networking processing performance. In particular, the present disclosure relates to a system and method for providing a rate limiting mechanism based on device load/capacity ratio or traffic content.

Specifically, the system is capable of applying rate limits on the number of packets and/or the number of sessions based on a variety of factors, such as, current system load, system capacity, ratio between current load and capacity, type of request packets, content of request packets, etc. Moreover, the system can determine and communicate a wait time period to the client based on the above factors.

A system failure, a system reset, installation of a new controller device or another event may cause a multitude of access points to request configuration information at the same time which results in a system overload. In one or more embodiments, deep packet inspection is used to rate limit the requests for new configuration information. Components within a data plane, i.e., components at an ingress interface that receive the requests for new configuration information, limit the number of configuration requests that are forwarded to a Central Processing Unit (CPU). Specifically, the device components at an ingress interface identify requests for new configuration based on deep packet inspection or using another mechanism. In an example, a "hello" message from an access point is recognized as a request to initiate a configuration process.

Thereafter, per period of time, the device components forward the requests to the CPU until a threshold number of requests have been forwarded. Once the threshold number of requests has been forwarded, the components refrain from forwarding additional requests during that period of time. The additional requests may simply be dropped and/or senders of the additional requests may be informed that the system is busy. Based on the messages received the senders of the additional requests may temporarily refrain from re-sending the requests.

In an embodiment, components at the ingress interface of a device forward packets to a Central Processing Unit (CPU) based on the current load of the CPU. If the load of the CPU is above a particular threshold, the components do not forward the packets to the CPU for processing by the CPU. If the load of the CPU is below the particular threshold, the components forward the packets to the CPU for processing by the CPU.

Rate-limiting the amount of data that is forwarded from the ingress interface (also referred to herein as the data plane) to the Central Processing Unit (also referred to herein as a portion of the control plane), protects the control plane from being overloaded.

In an embodiment, requests are received from a first device during a particular time period via an IP-sec tunnel that has been established for communication with the device. Rate-limiting requests, as described above, results in rejection of the requests because an allowed number of requests for the particular time period have already been forwarded to the CPU. A message is transmitted to the first device to (1) cause the first device to maintain the IP-sec tunnel, (2) refrain from re-sending the request, and/or (3) re-send the request after some time has elapsed. Maintaining the IP-sec tunnel is advantageous as the IP-sec tunnel does not have to be re-established. For example, an exchange of security credentials and/or establishing a security association does not have to be redone.

In an embodiment, the present disclosure relates to limiting a number of communication sessions. For example, the present disclosure relates to initiating a threshold number of communication sessions within a particular time period and rejecting requests for the initiation of communication sessions after the threshold number has been reached.

Applications executing on one or more devices may establish a communication session for exchanging data. Session information about the communication session is stored on at least one device executing one of the applications that are exchanging data. Session information may include information associated with the applications, users, devices, etc. involved in the communication session. Session information may include a unique identifier to distinguish the corresponding communication session from other communication sessions.

In an example, a first client device executing a first application stores session information about a communication session. Messages transmitted on behalf of the first application by the first client device include the session information so that receiving devices and/or applications are able to identify the session.

In an example, a first endpoint, such as a first application executing on a first device may attempt to establish a communication session with a second endpoint, such as a second application executing on a second device (or the same first device). In order to establish a communication session, the first endpoint transmits a first packet that identifies a source port as the port which corresponds to the first application and an initial sequence number. The first packet further identifies a destination port as the port which corresponds to the second application. The second application receives the first packet and stores the sequence number of the first packet. Furthermore, the second application transmits a reply packet to the first application with an initial sequence number. The first or second application may store or manage session information about the session and refer to the session information for future communication.

In an embodiment, different control plan traffic is rate limited at different rates. In an embodiment, Access Control Lists (ACLs) are used to implement different rates. In an example, a source port or a destination port is associated with a particular rate for a particular type of traffic (e.g., initiation of a new communication session). The particular rate indicates a number of communication sessions that may be initiated. When a source port sends a new request for initiating a communication session, a number of already-initiated sessions is compared to a threshold number of sessions. If the number of already-initiated sessions requested by that source port meets or exceeds the threshold number of sessions, then the request is rejected. If the number of already-initiated sessions requested by that source port does not meet or exceed the threshold number of sessions, then the request is granted and the communication session is established.

General Architecture

FIG. 1 illustrates a general architecture including multiple processing planes according to embodiments of the present disclosure. The disclosed system includes a plurality of control place processors (e.g., CP CPU1, CP CPU2, CP CPU 3, . . . CP CPU M) and a plurality of datapath processors, which include a slowpath (SP) processor (e.g., SP CPU) and multiple fastpath (FP) processor (e.g., FP CPU 1, FP CPU 2 . . . FP CPU N). The disclosed system also includes a lockless shared memory that can be accessed by all datapath processors in the system.

Specifically, FIG. 1 includes at least a control plane process 110, two or more datapath processors 120, a lockless shared memory 160 accessible by the two or more datapath processors 120, and a network interface 150.

Control plane process 210 may be running on one or more CPU or CPU cores, such as CP CPU 1 112, CP CPU 2 114, . . . CP CPU M 118. Furthermore, control plane process 110 typically handles network control or management traffic generated by and/or terminated at network devices as opposed to data traffic generated and/or terminated at client devices.

According to embodiments of the present disclosure, datapath processors 120 include a single slowpath (SP) processor (e.g., SP CPU 130) and multiple fastpath (FP) processors (e.g., FP CPU 1 140, FP CPU 2 142, . . . FP CPU N 148). Only FP processors are able to receive data packets directly from network interface 150. SP processor, on the other hand, only receives data packets from FP processors.

Lockless shared memory 160 is a flat structure that is shared by all datapath processors 120, and not tied to any particular CPU or CPUs. Any datapath processor 120 can read any memory location within lockless shared memory 160. Therefore, both the single SP processor (e.g., SP CPU 130) and the multiple FP processors (e.g., FP CPU 1 140, FP CPU 2 142, . . . FP CPU N 148) have read access to lockless shared memory 160, but only the single SP processor (e.g., SP CPU 130) has write access to lockless shared memory 160. More specifically, any datapath processor 120 can have access to any location in lockless shared memory 160 in the disclosed system.

Also, control plane process 110 is communicatively coupled to slowpath (SP) CPU 130, but not fastpath (FP) processors (e.g., FP CPU 1 140, FP CPU 2 142, . . . FP CPU N 148). Thus, whenever control plane process 110 needs information from datapath processors 120, control plane process 110 will communicate with SP processor (e.g., SP CPU 130).

Rate Limiting Based on Load/Capacity Ratio

Figure 2:
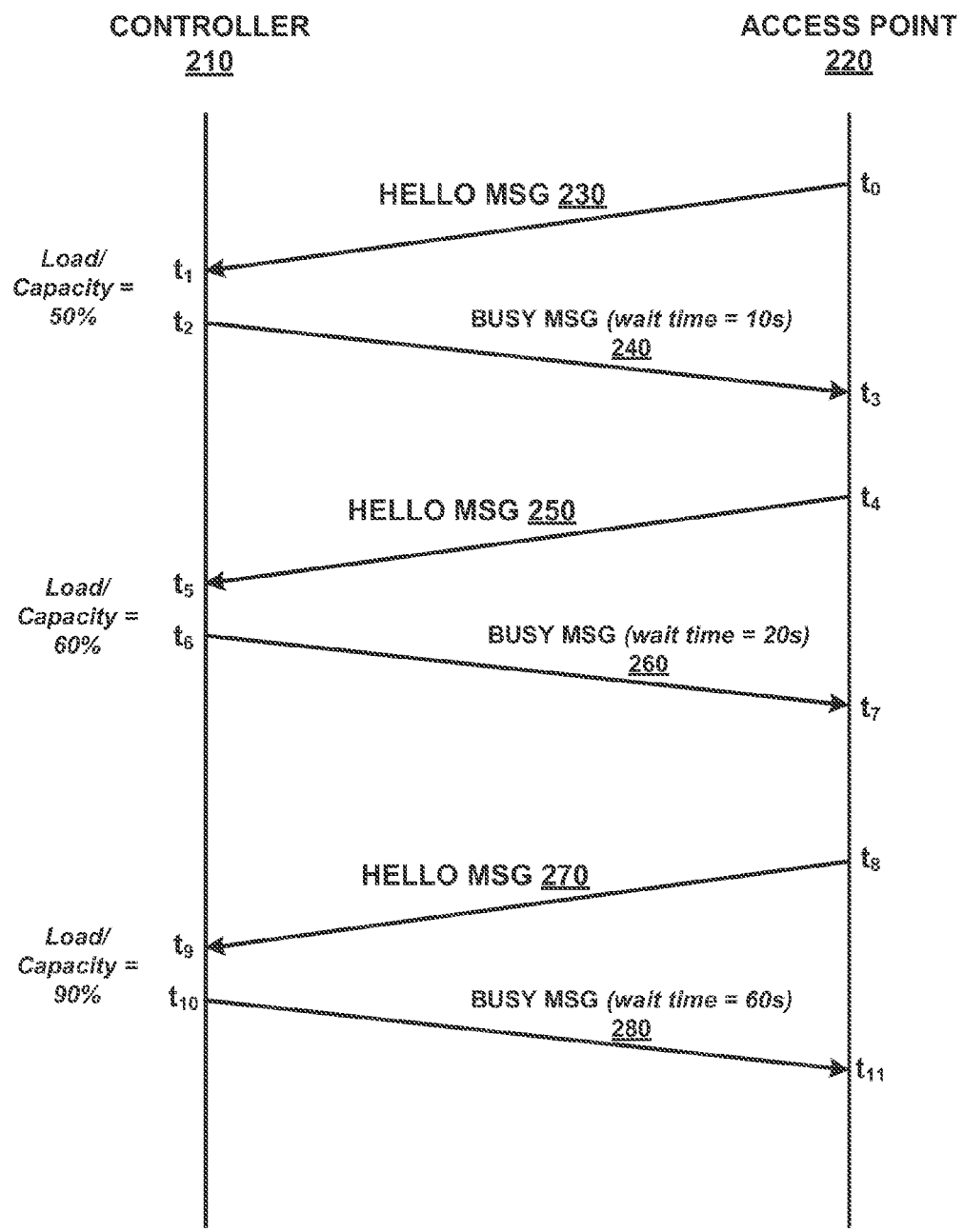
FIG. 2 illustrates exemplary communication exchanges between a controller and access points for client authentication processes according to embodiments of the present disclosure.

FIG. 2 illustrates exemplary communication exchanges between a controller and access points for client authentication processes according to embodiments of the present disclosure. Specifically, FIG. 2 includes a controller 210 and an access point 220, and communication exchanges between controller 210 and access point 220.

At time point $t_0$, access point 220 sends a "hello" message 230 to controller 210. "Hello" message 230 is received by controller 210 at time point $t_1$. Assuming that, at time point $t_1$, controller 210 determines that the ratio between real-time controller device load and controller capacity is 50%. Based on the determined load/capacity ratio at time point $t_1$, controller 210 can either send a response or send a busy message 240 to access point 220 in response to "hello" message 230. For example, in some embodiments, controller 210 may compare the current load/capacity ratio at time point $t_1$ with a predetermined threshold. If the load/capacity ratio is higher than the threshold, controller 210 will send busy message 240 at time point $t_2$; otherwise, controller 210 will respond to "hello" message 230. Furthermore, if controller 210 decides to send busy message 240, controller 210 can further determine a wait time period indicating the amount of time access point 220 shall wait before sending another request of the same type to controller 210. The wait time period can be determined as a function of the load/capacity ratio, e.g., the wait time can be directly proportional to the load/capacity ratio. Busy message 240, which is received by access point 220 at time point $t_3$, will include the determined wait time period (in this example, 10 seconds).

Likewise, at time point $t_4$, access point 220 sends a second "hello" message 250 to controller 210. "Hello" message 250 is received by controller 210 at time point $t_5$. Assuming that, at time point $t_6$, controller 210 determines that the ratio between real-time controller device load and controller capacity is 60%. Based on the determined load/capacity ratio at time point $t_6$, controller 210 can send a busy message 260 to access point 220 at time point $t_6$ in response to "hello" message 250. Furthermore, controller 210 can determine a wait time period, e.g., 20 seconds, based on the load/capacity ratio, e.g., 60%. Busy message 260, which is received by access point 220 at time point $t_7$, will include the determined wait time (e.g., 20 seconds).

Similarly, assuming that, at time point $t_8$, access point 220 sends a third "hello" message 270 to controller 210. "Hello" message 270 is received by controller 210 at time point $t_9$. Assuming that, at time point $t_9$, controller 210 determines that the ratio between real-time controller device load and controller capacity is 90%. Based on the determined load/capacity ratio at time point $t_9$, controller 210 can send a busy message 280 to access point 220 at time point $t_{10}$ in response to "hello" message 270. Furthermore, controller 210 can determine a wait time period, e.g., 60 seconds, based on the load/capacity ratio, e.g., 90%. Busy message 260, which is received by access point 220 at time point $t_7$, will include the determined wait time period (e.g., 60 seconds).

In some embodiments, where controller 210 is connected to a number of access points and each access point has a number of associated wireless clients, the capacity of controller 210 can be measured by the maximum total number of clients that all of the access points connected to controller 210 can service collectively. On the other hand, the current load of controller 210 indicates the actual number of clients that are associated with any access points currently connected to controller 210.

Rate Limiting Packets Based on Traffic Content

Figure 3:
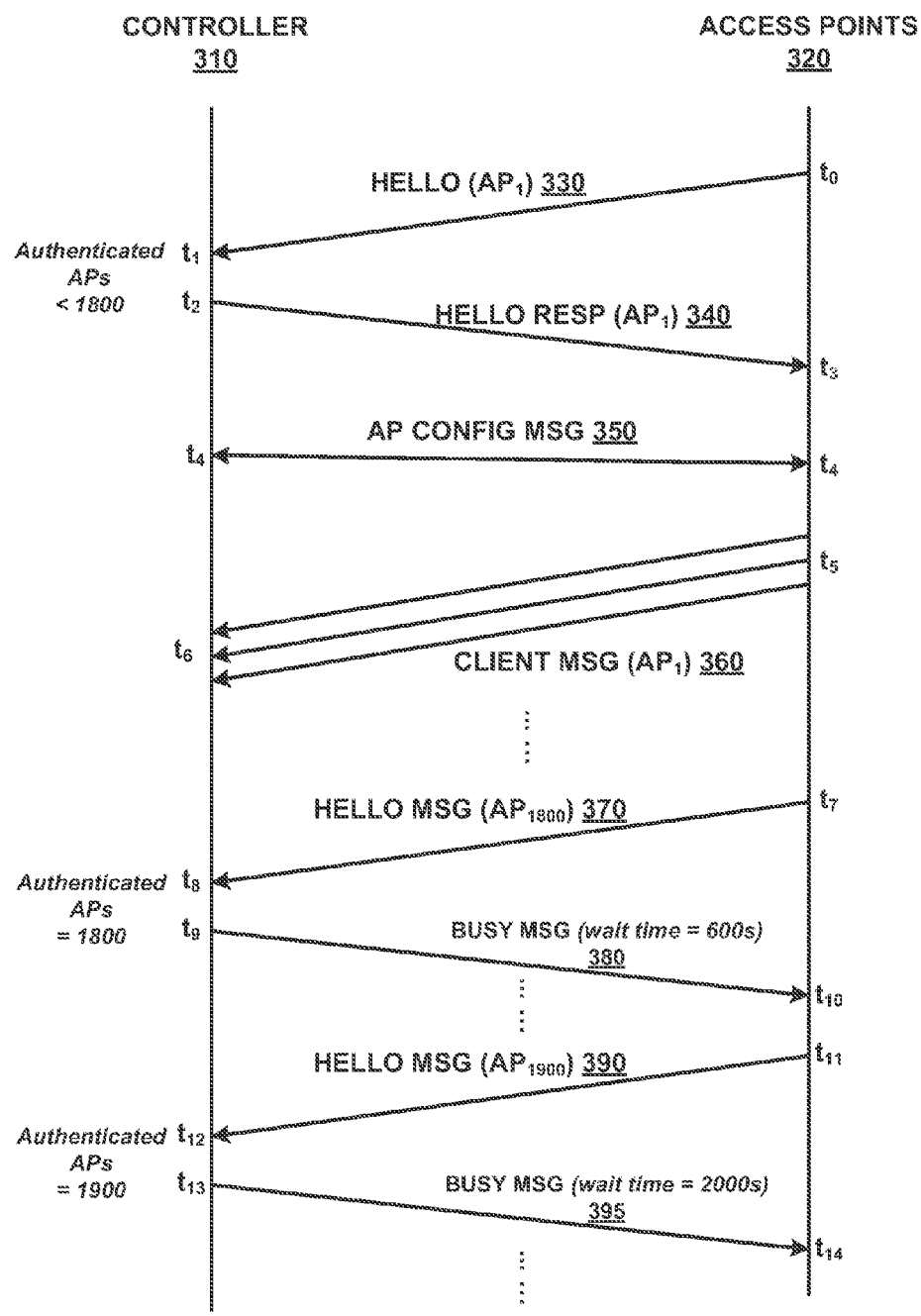
FIG. 3 is a diagram illustrating another exemplary communications between controller and access points for client authentication processes according to embodiments of the present disclosure.

FIG. 3 is a diagram illustrating another exemplary communications between controller and access points for client authentication processes according to embodiments of the present disclosure. Specifically, FIG. 3 includes a controller 310 and a number of access points 320 and communication exchanges between controller 310 and access points 320.

Generally, the communication exchanges between controller 310 and each access point 320 follow the certain protocols, which create dependencies between the communication exchange messages. For example, an access point 320 may first send a "hello" message to controller 310. Next, controller 310 sends a busy message or a "hello" response message to access point 310. Subsequently, access point configuration messages are exchanged between controller 310 and access point 320. Finally, access point 320 starts to forward client messages to controller 310. In this example, access point configuration messages are dependent on the successful transmission and process of "hello" message from access point 320. Also, client messages are dependent on the successful transmission and process of the access point configuration messages. Therefore, controller 310 is expected to receive different types of messages from the same access point according to a predetermined sequence order, e.g., "hello" message followed by access point configuration message, followed by client messages forwarded by the access points. Then, controller 310 can monitor the total number of authenticated access points that are connected to controller 310, and start respond to certain types of messages (e.g., "hello" message) with busy message when the total number of authenticated access points exceeds a predetermined threshold.

Note that, controller 310 may only respond to "hello" messages from new access points with busy message, while continuing to access other types of messages, e.g., access configuration messages and/or client messages from authenticated access points. In a hypothetical scenario, if network controller 310 already has 200 access points connected to it and there are 20 clients associated with each access point, then there are a total of 2,000 clients sending messages that are transmitted through controller 310 via 200 access points. Adding another authenticated access point would not help improving the performance of controller 310, because it would allow a significant number of clients to able to transmit messages through controller 310 that is already overloaded. Therefore, it is more effective to throttle the number of access points that controller 310 authenticates than throttling the number of clients.

In essence, a process, such as a software access point process (SAPM), residing on the disclosed network device can identify dependencies among different messages, perform a deep packet inspection to determine a type associated with a received message, and delay the processing of the message if it is the first message in a sequence of messages based on the identified dependencies among different messages.

Specifically, as illustrated in FIG. 3, at time point $t_0$, one of access points 320, e.g., $AP_1$, sends a "hello" message 330 to controller 310. "Hello" message 330 is received by controller 310 at time point $t_1$. Assuming that, at time point $t_1$, controller 310 determines that the total number of authenticated access points that are connected to controller 310 is less than a predetermined threshold, e.g., 1,800 authenticated access points. Based on the determined total number of authenticated access points at time point $t_1$, controller 310 sends a "hello" response message 340 to access point ($AP_1$) 320 at time point $t_2$ in response to "hello" message 330. "Hello" response message 340 is received by access point ($AP_1$) 320 at time point $t_3$. Subsequently, controller 310 and access point ($AP_1$) 320 exchange a number of access point configuration messages 350. Access point configuration messages 350 include specific configuration information for access point $AP_1$ 320. Upon completion of configuration at time point $t_5$, access point ($AP_1$) 320 will start forwarding client messages 360, which are received by controller 310 at time point $t_6$.

Now, assuming that at time point $t_7$, another one of access points 320, e.g., $AP_{1800}$, sends a "hello" message 370 to controller 310. "Hello" message 370 is received by controller 310 at time point $t_8$. Furthermore, assuming that, at time point $t_8$, controller 310 determines that the total number of authenticated access points equals to a predetermined threshold, e.g., 1,800 authenticated access points. Based on the determined total number of authenticated access points at time point $t_8$, controller 310 determines a wait time period for access point $AP_{1800}$, e.g., 600 seconds. Then, controller 310 sends a busy response message 380 to access point ($AP_{1800}$) 320 at time point $t_9$ in response to "hello" message 370. Busy message 380 includes the determined wait time period for access point $AP_{1800}$, and is received by access point $AP_{1800}$ at time point $t_{10}$. Note that, the wait time period indicates the amount of time access point $AP_{1800}$ 320 shall wait before sending "hello" message to controller 310. The wait time period can be determined as a function of the total number of authenticated access points that are currently connected to controller 310, e.g., the wait time period can be directly proportional to the number of authenticated access points connected to controller 310.

As another example, assuming that at time point $t_{11}$, another one of access points 320, e.g., $AP_{1900}$, sends a "hello" message 390 to controller 310. "Hello" message 390 is received by controller 310 at time point $t_{12}$. Furthermore, assuming that, at time point $t_{12}$, controller 310 determines that the total number of authenticated access points, e.g., 1,900 authenticated access points, is greater than a predetermined threshold, e.g., 1,800 authenticated access points. Based on the determined total number of authenticated access points at time point $t_{12}$, controller 310 determines a wait time period for access point $AP_{1900}$, e.g., 2,000 seconds. Alternatively or additionally, the wait time period and/or the predetermined threshold can also be determined based on system load metrics, which may include, but are not limited to, control plane (CP) processor utilization, slowpath (SP) processor utilization, and/or fastpath (FP) processor utilization. Then, controller 310 sends a busy response message 395 to access point ($AP_{1900}$) 320 at time point $t_{13}$ in response to "hello" message 390. Busy message 395 includes the determined wait time period (e.g., 2,000 seconds) for access point $AP_{1900}$, and is received by access point $AP_{1900}$ at time point $t_{14}$. Note that, the wait time period indicates the amount of time access point $AP_{1900}$ 320 shall wait before sending another "hello" message to controller 310.

Rate Limiting on Number of Concurrent Sessions

Figure 4A:
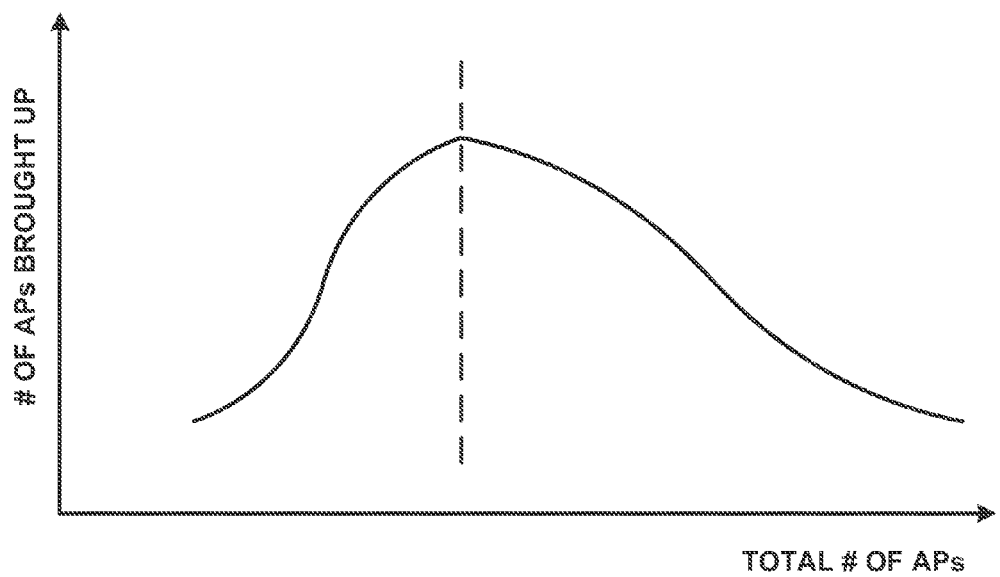
FIGS. 4A-4B are diagrams illustrating exemplary system performance in relation to the number of concurrent sessions according to embodiments of the present disclosure.
Figure 4B:
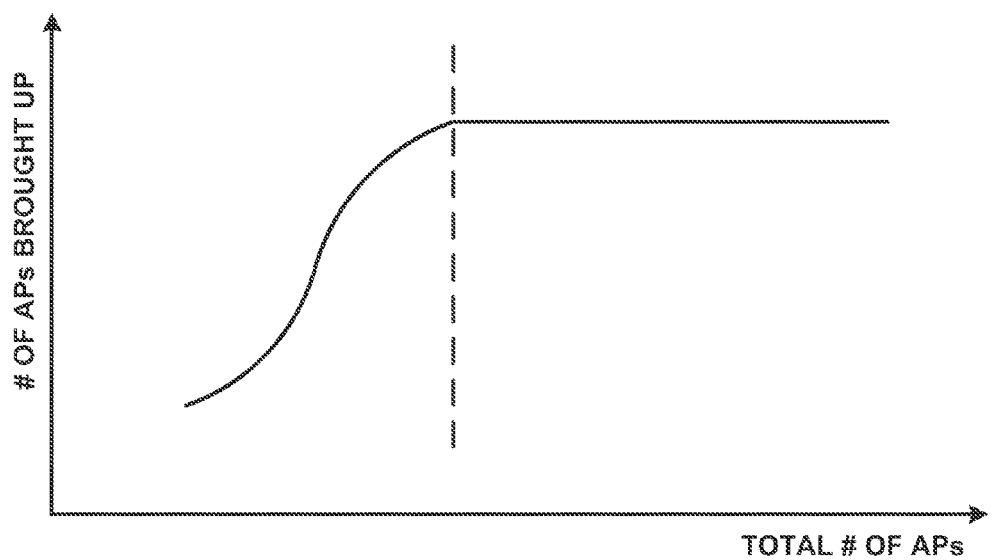

FIGS. 4A-4B are diagrams illustrating exemplary system performance in relation to the number of concurrent sessions according to embodiments of the present disclosure. As illustrated in FIG. 4A, as the total number of access points initiating requests to join a network increases, the number of access points that are brought up, i.e., those that are successfully authenticated into the network, increases accordingly. Nevertheless, at some point during the increase in the total number of access points when the system gets overloaded, the total number of access points that remain authenticated in the network will begin to decrease. This is because, when performance of the controller downgrade, the client communication sessions and control sessions between the access points and the controller will start to experience time out, and get dropped by the controller.

As illustrated in FIG. 4B, the system disclosed herein is able to locate the peaking point of performance by identifying the maximum number of concurrent sessions that the controller can support without suffering from poor performance. Thereafter, the disclosed system can apply the rate limiting mechanism on the identified maximum number of concurrent sessions such that the system can perform at the peak level as it approaches its maximum number of concurrent sessions.

Therefore, besides rate limiting on packets, the rate limiting mechanism disclosed in the present disclosure can also be applied on communication sessions. When rate limiting mechanism is applied to packets, the system determines whether or not to discard a received packet based on various metrics, such as, system load, system capacity, CP processor utilization, SP/FP processor utilization, load/capacity ratio, traffic content, packet type, etc. When rate limiting mechanism is applied to sessions, the system will decline request for creation of a session, and instead return a busy message indicating a wait time period after which the session creation request shall be retransmitted.

Rate Limiting Mechanism Using Access Control Lists (ACL)

According to the present disclosure, the rate limiting on concurrent sessions can be performed in a number of different ways. First, the controller can determine the number of sessions that can are created and associated with a specific "hello" message. Because the "hello" message exchanges follow a specific pattern, the controller can define and use an access control list (ACL) for rate limiting of the number of concurrent sessions allowed per "hello" message. For example, the controller can specify an ACL entry to indicate that no more than 200 concurrent sessions are allowed from the access point that sent a particular "hello" message. Each of the 200 concurrent sessions corresponds to a client communication session.

In addition, the controller can determine the maximum number of control sessions that are allowed by the system. For example, the controller can specify in an ACL that no more than 100 control sessions are allowed. Each control session corresponds to a communication session between the controller and an access point. Accordingly, no more than 100 access points can be connected to the controller at any given time.

FIGS. 5A-5B illustrate exemplary ACLs for rate limiting. Specifically, FIG. 5A illustrates an exemplary ACL for rate limiting where a secured communication tunnel (e.g., a GRE tunnel) is involved in the communications between the controller and the access point, for example, by enabling CP sec feature at the access point. When the CP sec is enabled on the access point, the first message communicated between the controller and the access point will be an Internet Key Exchange (IKE) handshake. IKE is used to negotiate an agreed Security Association (SA) between two or more clients to establish an IPSEC VPN tunnel. IKE consists of two phases, phase 1 establishes a secure communication channel and phase 2 uses this channel to encrypt and transport the data.

The ACL entry illustrated in FIG. 5A includes at least access point (AP) sub-network 500, controller Internet Protocol (IP) address 510, protocol 520, and access control policy 530. In this example, AP sub-network 500 has a value of "10.10.20.0/16;" controller IP 510 has a value of "10.10.10.10;" protocol 520 indicates Encapsulating Security Payload (ESP); and, access control policy 530 indicates a rate limiting policy that permits a maximum of 100 concurrent sessions per second.

FIG. 5B illustrates an exemplary ACL for rate limiting where no secured communication tunnel is involved in the communications between the controller and the access point. Typically, the CP sec is disabled on access point. For such an access point, the first message exchanged between the controller and the access point is usually a "hello" message, which is a User Datagram Protocol (UDP) message, e.g., on port 8211.

The ACL entry illustrated in FIG. 5B includes at least access point (AP) sub-network 540, controller Internet Protocol (IP) address 550, protocol 560, source port 570, destination port 580, and access control policy 590. In this example, AP sub-network 540 has a value of "10.10.30.0/8;" controller IP 550 has a value of "10.10.10.10;" protocol 560 indicates User Datagram Protocol (UDP); source port 570 can be any port; destination port 580 is port 8211; and access control policy 590 indicates a rate limiting policy that permits 100 sessions per second.

In addition, access control policy 590 may also indicate a maximum allowed number of concurrent sessions, for example, a maximum of 150 concurrent sessions allowed by the controller. If such maximum session limitation is indicated in access control policy 590, when there are 150 active concurrent sessions supported by the controller, even though the current rate is less than the policy limit of 100 sessions per second, the controller will not permit any additional sessions to be established until the total number of active concurrent sessions is below the specified maximum number, e.g., 150 sessions.

Processes for Rate Limiting Based on Device Load/Capacity or Traffic Content

Figure 6A:
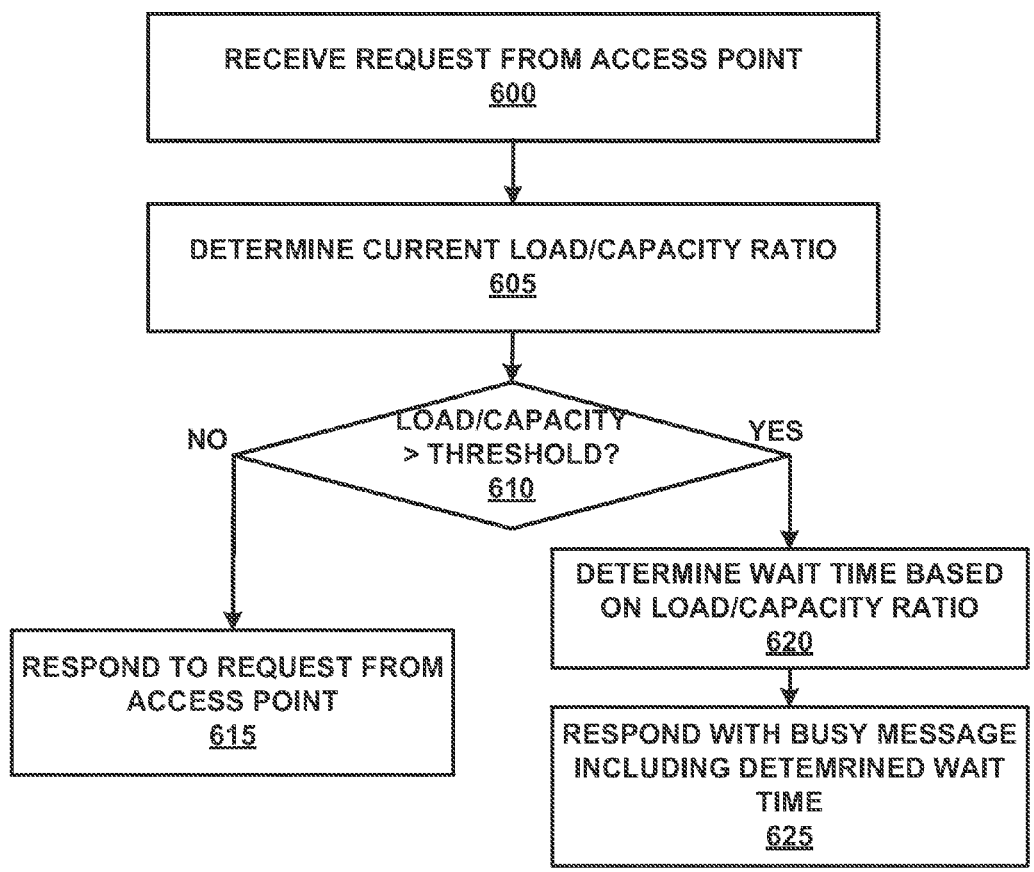
FIGS. 6A-6C are flowcharts illustrating exemplary rate limiting mechanisms based on device load/capacity or traffic contents according to embodiments of the present disclosure.
Figure 6B:
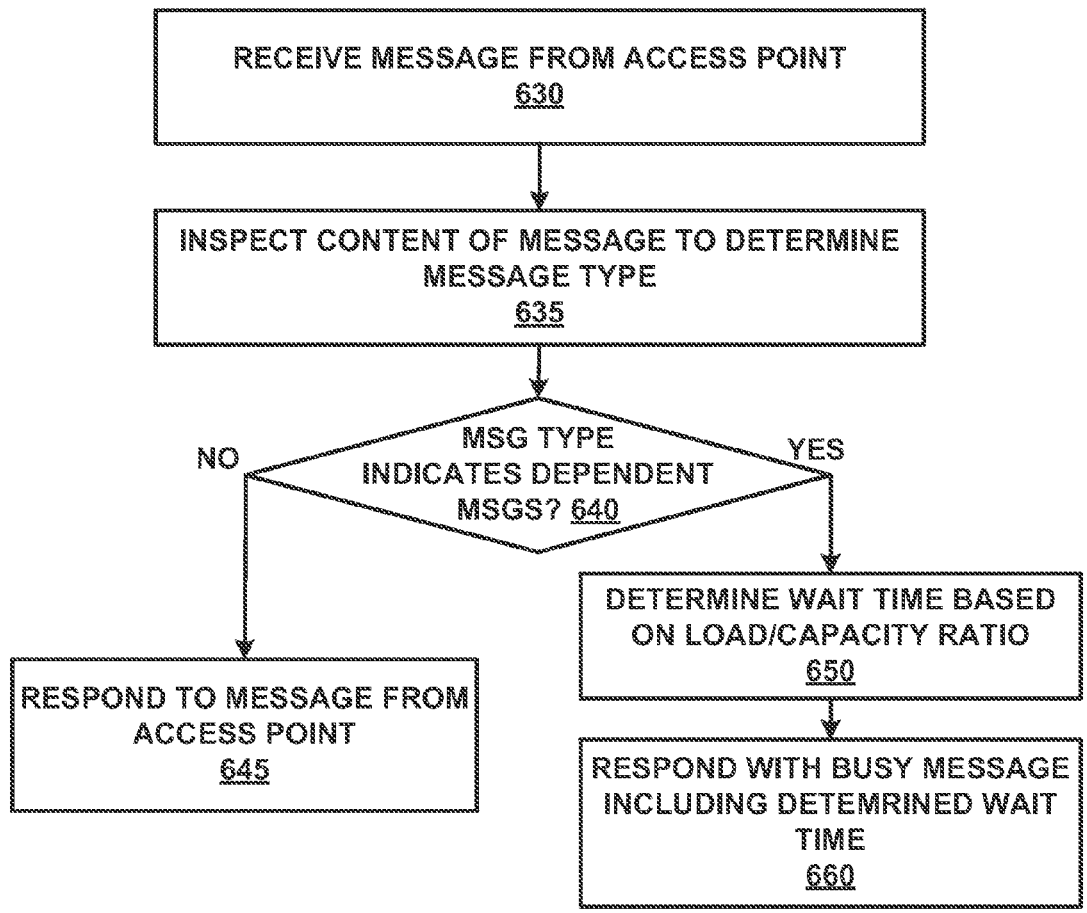
Figure 6C:
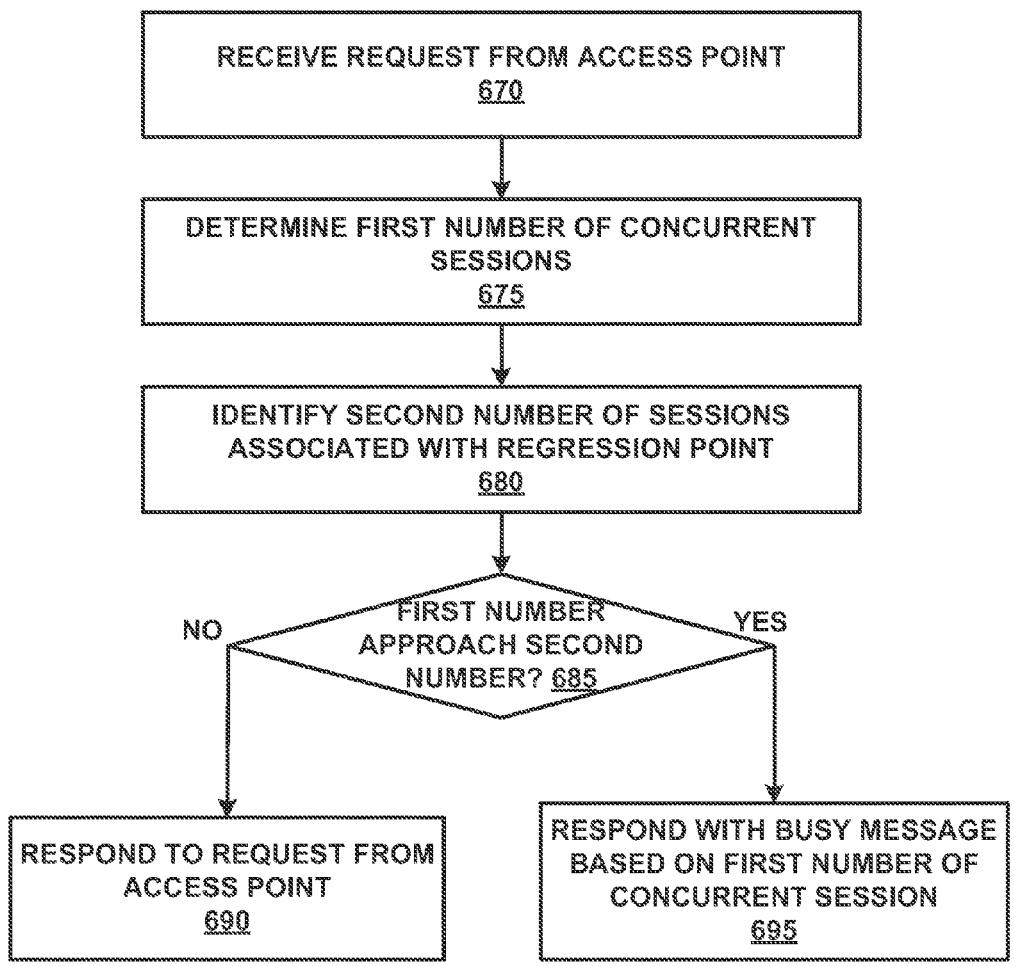

FIG. 6A-6C are flowcharts illustrating rate limiting mechanisms based on device load/capacity or traffic contents. Specifically, FIG. 6A is a flowchart illustrating a rate limiting mechanism based on load/capacity ratio according to embodiments of present disclosure. During operation, the disclosed system receives a request from an access point (operation 600). The disclosed system then determines a current load/capacity ratio (operation 605). Next, the disclosed system determines whether the load/capacity ratio is greater than a predetermined threshold (operation 610). If not, the disclosed system responds to the request from the access point (operation 615). Otherwise, the disclosed system determines a wait time period based on load/capacity ratio (operation 620), and responds with a busy message including the determined wait time period (operation 625).

FIG. 6B is a flowchart illustrating a rate limiting mechanism based on traffic content according to embodiments of present disclosure. During operation, the disclosed system receives a message from an access point (operation 630). Then, the disclosed system inspects the content of the message to determine a message type (operation 635). Next, the disclosed system determines whether the message type indicates that the message has dependent messages (operation 640). If not, the disclosed system responds to the message from the access point (operation 645). Otherwise, the disclosed system determines a wait time period based on the current load/capacity ratio (operation 650), and responds with a busy message including the determined wait time period (operation 660).

FIG. 6C is a flowchart illustrating a rate limiting mechanism based on the number of concurrent sessions according to embodiments of present disclosure. During operation, the disclosed system receives a request from an access point (operation 670). Then, the disclosed system determines a first number of concurrent sessions (operation 675). Furthermore, the disclosed system identifies a second number of sessions associated with a regression point (operation 680). Generally, the regression point corresponds to the peaking point of performance, which can be determined by identifying the maximum number of concurrent sessions that the controller can support without suffering from poor performance. Next, the disclosed system determines whether the first number approaches the second number (operation 685). If the first number is not approaching the second number, then the disclosed system responds to the request from the access point (operation 690). Otherwise, the system responds to the request with a busy message based on the first number of concurrent sessions (operation 695).

System for Rate Limiting Based on Device Load/Capacity or Traffic Content

Figure 7:
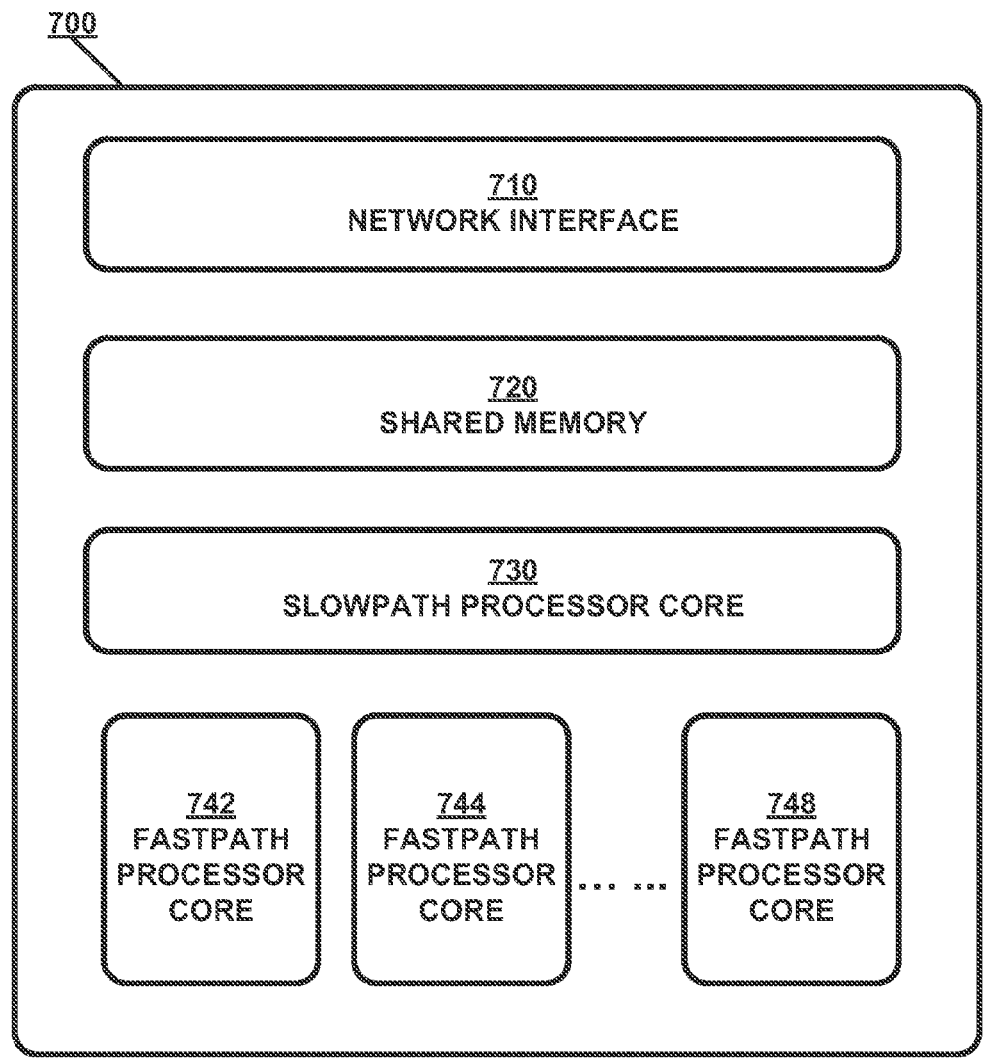
FIG. 7 is a block diagram illustrating a system of rate limiting mechanisms based on device load/capacity or traffic contents according to embodiments of the present disclosure.

FIG. 7 is a block diagram illustrating a network device system of rate limiting mechanisms based on device load/capacity or traffic contents. Network device 700 includes at least a network interface 710 capable of communicating to a wired network, a shared memory 720 capable of storing data, a slowpath processor core 730 capable of processing network data packets, and one or more fastpath processor cores, including fastpath processor core 742, fastpath processor core 744, . . . , fastpath processor core 748, which are capable of processing network data packets. Moreover, network device 600 may be used as a network switch, network router, network controller, network server, etc. Further network device 600 may serve as a node in a distributed or a cloud computing environment.

Network interface 710 can be any communication interface, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, network interface 710 may be software-defined and programmable, for example, via an Application Programming Interface (API), and thus allowing for remote control of the network device 700.

Shared memory 720 can include storage components, such as, Dynamic Random Access Memory (DRAM), Static Random Access Memory (SRAM), etc. In some embodiments, shared memory 720 is a flat structure that is shared by all datapath processors (including, e.g., slow path processor core 730, fastpath processor core 742, fastpath processor core 744, . . . , fastpath processor core 748, etc.), and not tied to any particular CPU or CPU cores. Any datapath processor can read any memory location within shared memory 720. Shared memory 720 can be used to store various tables to facilitate control plane protection for the various tables using storm prevention entries. For example, the tables may include, but are not limited to, a bridge table, a session table, a user table, a station table, a tunnel table, a route table and/or route cache, etc. It is important to note that there is no locking mechanism associated with shared memory 720. Any datapath processor can have access to any location in lockless shared memory in network device 700.

Slowpath processor core 730 typically includes a networking processor core that is capable of processing network data traffic. Slowpath processor core 730 is a single dedicated CPU core that typically handles table managements. Note that, slowpath processor core 730 only receives data packets from one or more fastpath processor cores, such as fastpath processor core 742, fastpath processor core 744, . . . , fastpath processor core 748. In other words, slowpath processor core 730 does not receive data packets directly from any line cards or network interfaces. Only the plurality of fastpath processor cores can send data packets to slowpath processor core 730. Moreover, slowpath processor core 730 is the only processor core having the write access to shared memory 720, and thereby will not cause any data integrity issues even without a locking mechanism in place for shared memory 720.

Fastpath processor cores 742-748 also include networking processor cores that are capable of processing network data traffic. However, by definition, fastpath processor cores 742-748 only performs "fast" packet processing. Thus, fastpath processor cores 742-748 do not block themselves and wait for other components or modules during the processing of network packets. Any packets requiring special handling or wait by a processor core will be handed over by fastpath processor cores 742-748 to slowpath processor core 730.

Each of fastpath processor cores 742-748 maintains one or more counters. The counters are defined as a regular data type, for example, unsigned integer, unsigned long long, etc., in lieu of an atomic data type. When a fastpath processor core 742-748 receives a packet, it may increment or decrement the values of the counters to reflect network traffic information, including but not limited to, the number of received frames, the number of received bytes, error conditions and/or error counts, etc. In addition, fastpath processor cores 742-748 can use such information to apply rate limiting mechanisms as described in the present disclosure.

A typical pipeline process at fastpath processor cores 742-748 includes one or more of: port lookup; VLAN lookup; port-VLAN table lookup; bridge table lookup; firewall session table lookup; route table lookup; packet encapsulation; packet encryption; packet decryption; tunnel decapsulation; forwarding; etc.

According to embodiments of the present disclosure, network services provided by network device 700, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A method comprising:
    receiving, by a network device, a request from an access point;
    determining, by the network device, whether a ratio between a current load of the network device and a capacity of the network device exceeds a threshold;
    determining, by the network device, whether the request is associated with dependent messages based on a message type of the request, wherein the dependent messages are to be transmitted to the network device by the access point according to a predetermined sequence order in response to successful transmission and processing of the request by the network device;
    in response to the ratio between the current load and the capacity exceeding the threshold and the request being associated with dependent messages, determining, by the network device, a wait time period based at least on the ratio between the current load and the capacity; and
    responding, by the network device, to the access point with a message including the wait time period.

2. The method of claim 1, further comprising:
    in response to the ratio between the current load and the capacity not exceeding the threshold, responding, by the network device, to the message from the access point.

3. The method of claim 1, wherein the determined wait time period increases in response to an increase in the ratio between the current load and the capacity.

4. The method of claim 3, wherein the determined wait time period is proportional to the ratio between the current load and the capacity.

5. The method of claim 1, further comprising:
    inspecting, by the network device, content of the request to determine a message type associated with the request.

6. The method of claim 1, wherein the request comprises a hello message, and wherein the dependent messages comprise one or more of a hello response message, an access point configuration message, and a client message.

7. The method of claim 1, further comprising:
    determining, by the network device, a first number of concurrent sessions currently connected to the network device;
    identifying, by the network device, a second number of sessions associated with a regression point, wherein an actual number of access points connected to the network device regresses in response to the network device accepting additional sessions beyond the regression point;
    determining, by the network device, whether the first number approaches to the second number; and
    in response to the first number approaching the second number, responding, by the network device, with the message based on the first number of concurrent sessions.

8. The method of claim 7, further comprising:
    using an access control list (ACL) to limit the first number of concurrent sessions, wherein the ACL indicates a rate associated with a total number of sessions per second that the network device accepts.

9. The method of claim 8, wherein the ACL comprises one or more of:
    an access point (AP) sub-network;
    a controller Internet Protocol (IP) address;
    a protocol;
    a source port;
    a destination port;
    an access control policy indicating one or more of: the rate associated with the total number of sessions per second that the network device accepts, and
    a maximum number of concurrent sessions that the network device accepts.

10. A network device having a symmetric multiprocessing architecture, the network device comprising:
    a plurality of CPU cores;
    a network interface to receive one or more data packets; and a memory whose access is shared by the dedicated CPU core and the plurality of CPU cores;

wherein the plurality of CPU cores are to:

receive a request from an access point;

determine whether a ratio between a current load of the network device and a capacity of the network device exceeds a threshold;

determined whether the request is associated with dependent messages based on a message type of the request, wherein the dependent messages are to be transmitted to the network device by the access point according to a predetermined sequence order in response to successful transmission and processing of the request by the network device;

in response to the ratio between a current load and the capacity exceeding the threshold and the request being associated with dependent messages, determine a wait time period based at least on the ratio between the current load and the capacity; and respond to the access point with a message including the wait time period.

11. The network device of claim 10, wherein the plurality of CPU cores further to:

respond to the message from the access point in response to the ratio between the current load and the capacity not exceeding the threshold.

12. The network device of claim 10, wherein the determined wait time period increases in response to an increase in the ratio between the current load and the capacity.

13. The network device of claim 12, wherein the determined wait time period is proportional to the ratio between the current load and the capacity.

14. The network device of claim 10, wherein the plurality of CPU cores further to:

inspect content of the request to determine a message type associated with the request.

15. The network device of claim 10, wherein the request comprises a hello message, and wherein the dependent messages comprise one or more of a hello response message, an access point configuration message, and a client message.

16. The network device of claim 10, wherein the plurality of CPU cores further to:

determine a first number of concurrent sessions currently connected to the network device;

identify a second number of sessions associated with a regression point, wherein an actual number of access points connected to the network device regresses in response to the network device accepting additional sessions beyond the regression point;

determine whether the first number approaches to the second number; and respond with the message based on the first number of concurrent sessions in response to the first number approaching the second number.

17. The network device of claim 16, wherein the plurality of CPU cores further to:

use an access control list (ACL) to limit the first number of concurrent sessions, wherein the ACL indicates a rate associated with a total number of sessions per second that the network device accepts.

18. The network device of claim 17, wherein the ACL comprises one or more of:

an access point (AP) sub-network;

a controller Internet Protocol (IP) address;

a protocol;

a source port;

a destination port;

an access control policy indicating one or more of: the rate associated with the total number of sessions per second that the network device accepts, and a maximum number of concurrent sessions that the network device accepts.

19. A non-transitory computer-readable storage medium storing embedded instructions for a plurality of operations that are executed by one or more mechanisms implemented within a network device having a symmetric multiprocessing architecture, the plurality of operations comprising:

receiving a request from an access point;

determining whether the request is associated with dependent messages based on a messages type of the request, wherein the dependent messages are to be transmitted to the network device by the access point according to a predetermined sequence order in response to successful transmission and processing of the request by the network device;

determining a ratio between a current load of the network device and a capacity of the network device;

in response to the ratio between the current load and the capacity exceeding the threshold and the request being associated with dependent messages, determining a wait time period based at least on the ratio between the current load and the capacity; and responding to the access point with a message including the wait time period.

* * * * *